(12) United States Patent
Park et al.

(10) Patent No.: US 7,613,544 B2
(45) Date of Patent: Nov. 3, 2009

(54) MOBILE ROBOT, AND SYSTEM AND METHOD FOR AUTONOMOUS NAVIGATION OF THE SAME

(75) Inventors: Dong-ryeol Park, Gyeonggi-do (KR); Seok-won Bang, Gangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 10/753,403

(22) Filed: Jan. 9, 2004

(65) Prior Publication Data
US 2004/0202351 A1    Oct. 14, 2004

(30) Foreign Application Priority Data
Jan. 11, 2003    (KR)    ........................ 10-2003-0001828

(51) Int. Cl.
*G06F 19/00* (2006.01)
(52) U.S. Cl. ........................ 700/245; 700/251; 700/259; 701/25; 701/207; 701/223; 701/225; 701/300
(58) Field of Classification Search ................. 701/207, 701/223, 225, 300, 208, 25; 700/245, 251, 700/259
See application file for complete search history.

(56) References Cited

U.S. PATENT DOCUMENTS

| | | | |
|---|---|---|---|
| 4,933,864 A | | 6/1990 | Evans, Jr. et al. |
| 5,477,459 A | * | 12/1995 | Clegg et al. .................. 701/300 |
| 5,491,670 A | | 2/1996 | Weber |
| 5,950,629 A | * | 9/1999 | Taylor et al. ................. 128/897 |
| 5,974,348 A | | 10/1999 | Rocks |
| 5,976,156 A | * | 11/1999 | Taylor et al. ................. 606/130 |
| 6,198,230 B1 | * | 3/2001 | Leeb et al. ................... 315/224 |
| 6,266,142 B1 | * | 7/2001 | Junkins et al. ............... 356/623 |
| 6,292,744 B1 | * | 9/2001 | Want et al. ................... 701/207 |
| 6,807,478 B2 | * | 10/2004 | Giannopoulos et al. ...... 701/207 |
| 7,038,584 B2 | * | 5/2006 | Carter ........................... 340/539.13 |
| 2002/0027652 A1 | * | 3/2002 | Paromtchik et al. ......... 356/141.1 |
| 2003/0023369 A1 | * | 1/2003 | Takashima ................... 701/208 |

(Continued)

FOREIGN PATENT DOCUMENTS

EP    0 224 237 B1    11/1990

(Continued)

OTHER PUBLICATIONS

European Search Report for corresponding EPO Application No. 04250058.

(Continued)

*Primary Examiner*—Khoi Tran
*Assistant Examiner*—Brian J Broadhead
(74) *Attorney, Agent, or Firm*—Staas & Halsey LLP

(57) ABSTRACT

Disclosed herein is a mobile robot, and system and method for autonomous navigation of the same. The mobile robot includes a communications module for transmitting a light source control signal to selectively control light sources of a landmark array to flicker, an image processing module for calculating image coordinates of the light sources from an image signal, a pose calculation module for calculating position coordinates of the mobile robot, a motion control module for calculating a moving path and controlling the mobile robot to move along the moving path, and a main control module for controlling interoperations of the modules and general operations of the mobile robot.

20 Claims, 6 Drawing Sheets

U.S. PATENT DOCUMENTS

2004/0167670 A1* 8/2004 Goncalves et al. .......... 700/259

FOREIGN PATENT DOCUMENTS

| EP | 0 264 331 B1 | 11/1992 |
| EP | 0662618 A | 1/1994 |
| JP | 2000-056006 A | 2/2000 |
| JP | 2001-142532 A | 5/2001 |
| JP | 2002-073170 A | 3/2002 |
| KR | 2002-39806 | 5/2002 |
| WO | WO86/06500 | 11/1986 |

OTHER PUBLICATIONS

Gonzalez, Rafael C. and Richard E. Woods, Digital Image Processing, 1993, 6 pages (including pp. 40-43, Addison-Wesley Publishing Company, Reading, Massachusetts.

Office Action issued by the Japanese Patent Office on Jun. 26, 2007 in corresponding Japanese Patent Application No. 2004-006104.

* cited by examiner

MOBILE ROBOT, AND SYSTEM AND METHOD FOR AUTONOMOUS NAVIGATION OF THE SAME

BACKGROUND OF THE INVENTION

This application claims the priority of Korean Patent Application No. 10-2003-0001828 filed on Jan. 11, 2003 in the Korean Intellectual Property Office, the disclosure of which is incorporated herein in its entirety by reference.

1. Field of the Invention

The present invention relates generally to a mobile robot, and system and method for autonomous navigation of the same, and more particularly to a mobile robot, and system and method for autonomous navigation of the same, in which the mobile robot controls the flickering of the light sources of a landmark array disposed in a working space and ascertains its position using one or more flicking light sources, thus enabling the autonomous navigation of the mobile robot.

2. Description of the Related Art

In general, an autonomous mobile robot should precisely recognize its current pose and move from the current position to a target position (destination) in order to freely move across a certain area.

To this end, a certain landmark array is employed as a means for providing world coordinates to allow the mobile robot to recognize its current position. The mobile robot recognizes the landmark array disposed in a certain working space through the signal processing of an image captured by a camera and ascertains its current position using the recognized landmark array.

Such a landmark array may be designed in various patterns. Generally, a certain geometrical pattern, such as a circle and a chain, is employed as the form of the landmark array.

Accordingly, the mobile robot extracts the certain pattern of a landmark array from an image signal for a working space. In this case, the process of extracting the pattern of the landmark array from the image signal is greatly affected by external environmental factors, such as the illumination of a working space captured by a camera.

That is, the recognition of the pattern of a landmark array from an image captured by a camera is greatly affected by external factors such as illumination, the shapes of molded objects, the patterns of wallpaper, etc. Accordingly, the operation process of recognizing the pattern of the landmark array becomes further complicated.

Additionally, since relatively long processing time is required to recognize the position of the mobile robot using the landmark array due to the complicated operation process, it is difficult for autonomous navigation of the mobile robot to be performed in real-time.

Further, in a home network environment that has been developed and widely implemented, in which all home appliances are controlled by using a mobile robot, it is not desirable in terms of appearance to install a certain pattern of a landmark array in the interior of a house.

Accordingly, there have been demands for a mobile robot and system for autonomous navigation of the mobile robot that is capable of autonomous moving through the use of a landmark array applicable to a home network environment and suitable for application to actual life due to adaptability to the variations of an external environment, such as illumination.

SUMMARY OF THE INVENTION

Accordingly, an object of the present invention is to provide a mobile robot, and system and method for autonomous navigation of the same, in which the mobile robot can ascertain its position by controlling the flickering of the light sources of a landmark array disposed in a working space, and can autonomously move to a destination based on the ascertained position.

Another object of the present invention is to provide a mobile robot, and system and method for autonomous navigation of the same, in which the mobile robot is capable of efficiently calculating its pose(position and heading angle) by selecting a light source suitable for the calculation of the position with reference to previously stored world coordinates of the light sources of a landmark array.

Yet another object of the present invention is to provide a means for providing world coordinates for autonomous navigation of the mobile robot, which uses a plurality of light sources having a certain wavelength as a landmark array, thus being suitable for a home network environment.

In order to accomplish the above object, the present invention provides a mobile robot, including a communication module for transmitting a light source control signal to selectively control the flickering of the light sources of a landmark array provided in a working space, an image processing module for calculating image coordinates of the flickering of the light sources by detecting the flickering of the light sources, controlled by a the light source control signal, a pose calculation module for calculating position coordinates of the mobile robot using the calculated image coordinates and previously stored world coordinates of the light sources, a move control module for calculating a moving path for the mobile robot by applying the position coordinates of the mobile robot to previously stored spatial coordinates of the working space and controlling the mobile robot to move along the moving path, and a main control module for controlling interoperations of the modules and general operations of the mobile robot.

Preferably, the mobile robot may further comprise a memory module for storing the world coordinates of the light sources, spatial coordinates of the mobile robot in the working space, and parameters calculated through camera calibration for compensating for distortion of the camera lens.

The camera may be equipped with a filter for filtering a certain wavelength of the light source.

In addition, the present invention provides a system for autonomous navigation of a mobile robot, including a landmark array comprising a plurality of light sources disposed in a certain area to selectively flicker, a landmark array control module for controlling the flickering of the light sources of the landmark array, and a mobile robot equipped with a pose calculation module for selectively controlling the flickering of the light sources of the landmark array by transmitting a light source control signal to the landmark array control module and recognizing a pose of the mobile robot using the flickering light sources.

In addition, the present invention provides a method for autonomous navigation of a mobile robot, including the first step of the mobile robot selectively controlling the flickering of the flickering of the light sources of a landmark array arranged across a certain working space, the second step of extracting image coordinates of the light sources by detecting a light source controlled to flicker from an image signal input from the camera, and the third step of calculating a current position of the mobile robot with reference to the image coordinates and previously stored world coordinates of the light sources.

BRIEF DESCRIPTION OF THE DRAWINGS

The above and other objects, features and advantages of the present invention will be more clearly understood from the following detailed description taken in conjunction with the accompanying drawings in which.

DESCRIPTION OF THE PREFERRED EMBODIMENTS

Figure 1:
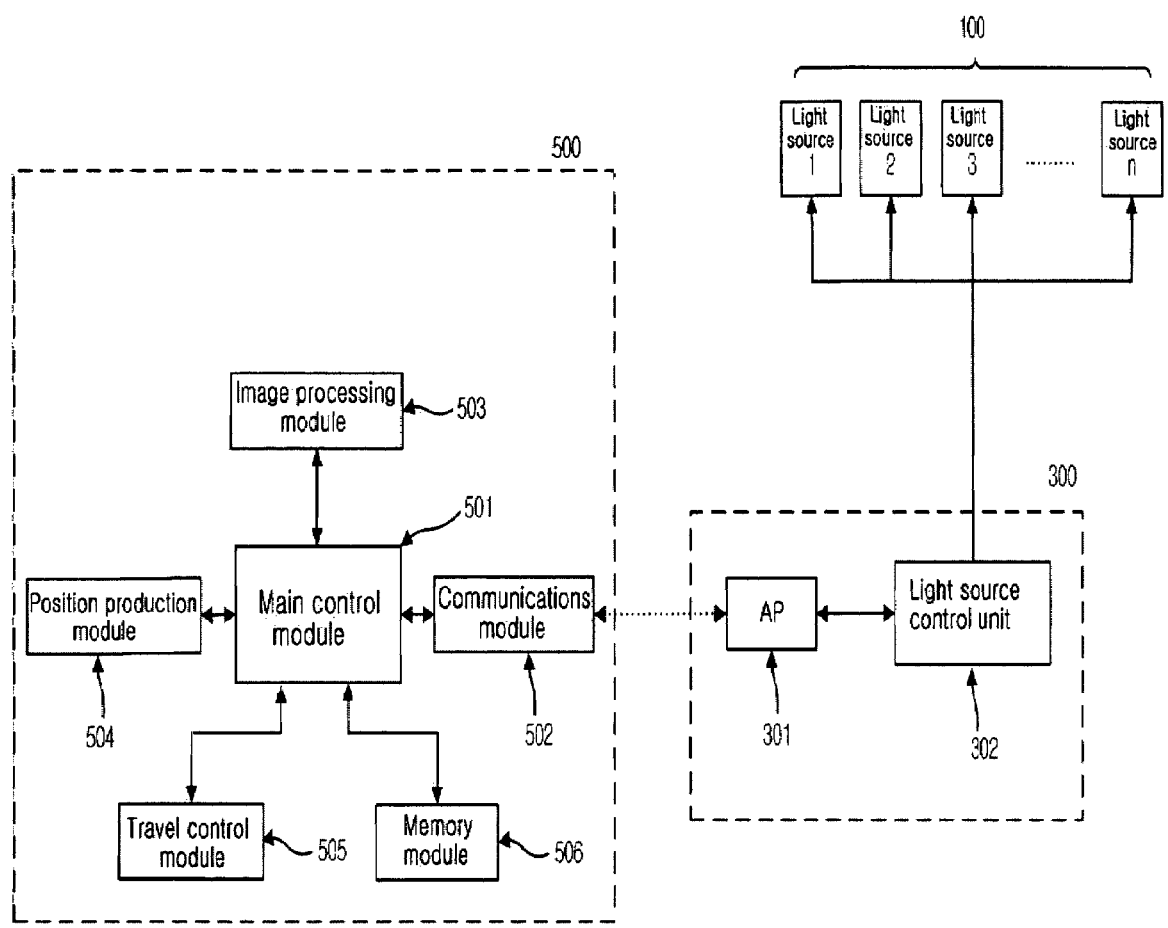
FIG. 1 is a schematic view showing the construction of a system for autonomous navigation of a mobile robot according to an embodiment of the present invention.

Reference now should be made to the drawings, in which the same reference numerals are used throughout the different drawings to designate the same or similar components.

The construction and operation of a mobile robot, and system and method for autonomous navigation of the same according to the present invention are described in detail with reference to the accompanying drawings.

As shown in FIG. 1, the system for autonomous navigation of the mobile robot includes a landmark array 100, a landmark array control module 300, and a mobile robot 500.

The landmark array 100 is made up of a plurality of light sources that are arranged across a certain area and can flicker. The light sources are formed of light emitting devices, including electro-luminescent devices, such as organic electro-luminescent devices, inorganic electro-luminescent devices, or Light Emitting Diodes (LEDs), which emit light with a certain wavelength and a certain brightness.

Meanwhile, the light sources are each assigned with position information comprised of a specific identification number and world coordinates in a working space in which the landmark array is arranged.

The landmark array control module 300 controls corresponding light sources of the landmark array 100 to flicker in response to a flickering control signal transmitted from the mobile robot 500. The landmark array control module 300 includes an access point (AP) 301 that is one of component devices constituting a wireless local area network and receives and processes the light source control signal transmitted from the mobile robot 500, and a light source control unit 302 that controls corresponding light sources to flicker in response to the light source control signal input from the access point 301.

The mobile robot 500 is constructed to include a pose calculation module 504 that selectively controls the flickering of the light sources of the landmark array 100 by transmitting a light source control signal to the landmark array control module 300 and recognizes the position thereof using the flickering light sources, thus enabling autonomous navigation. The mobile robot 500 further includes a main control module 501, a communications module 502, an image processing module 503, a motion control module 505, and a memory module 506.

The main control module 501 controls the entire operations of position calculation and moving according to an operation management algorithm for autonomous navigation of the mobile robot 500, and functions to control the interoperations of respective modules.

The communications module 502 transmits a light source control signal to control the light sources of the landmark array 100 to flicker under the operation control of the main control module 501 and the previously stored world coordinates of the light source are referenced by the communications module 502. Wireless communications performed to transmit/receive the light source control signal between the access point 301 and the communications module 502 is implemented in such a way that the access point 301 and the communications module 502 are newly assigned with frequencies of a high bandwidth, and transmit/receive data via the assigned frequencies.

Additionally, such wireless communications may be implemented by wireless communications protocols, such as Infrared Data Association (IrDA) using infrared radiation or Bluetooth that is a wireless local area communications technology.

The image processing module 503 processes a signal to detect feature points of the specified light source, controlled to flicker via the communications module 502, from an image signal obtained by a camera. The image processing module 503 includes a camera (not shown) equipped with a filter for filtering the image signal based on the wavelength of light sources, and a signal processing unit (not shown) for detecting feature points corresponding to the wavelength of the light sources from the image signal filtered by the camera, and for extracting the coordinates of the detected feature points (hereinafter referred to as "image coordinates").

The method of detecting feature points corresponding to the wavelength of light sources in the signal process unit and extracting image coordinates can be implemented through thresholding technology and grouping & labeling technology (4-connectivity) (Digital Image Processing; Rafael C. Gonzales, Richard E. Woods, Addison Wesley). This method is performed by binarizing the image signal filtered using the wavelength of the light sources, extracting a portion, on which pixels having a value equal to or greater than a certain value (for example, 50) are connected to each other and which has a gray level of 255, as the region of a light source, detecting the light source by removing noise components from the extracted region and extracting image coordinates based on the center of gravity.

The pose calculation module 504 calculates the precise coordinates of the mobile robot 500 with reference to image coordinates for the specified light source obtained through the image processing module 503 and the world coordinates of the certain light source detected through the memory module 506. The translation and rotation of the mobile robot 500 are calculated by applying the image coordinates and the world coordinates to the specified position calculation algorithm.

The position calculation algorithm constructs an extension model for obtaining the translation and rotation of the camera using a world coordinate system and a camera coordinate system, and obtaining a certain transformation formula for calculating the translation and rotation of the camera by applying the extension model to a formula for compensating for distortion caused by the lens of the camera.

The pose calculation module 504 determines the current pose of the mobile robot 500 by calculating a translation that is a distance by which the camera (that is, the mobile robot 500) is spaced apart from the specified light source and a rotation with respect to the light source by applying the image coordinates and world coordinates of the light source to the transformation formula obtained through the pose calculation algorithm.

The motion control module 505 controls the motion of the mobile robot 500 using a drive means for driving right and left wheel motors to allow the mobile robot 500 to autonomously move. The motion control module 505 determines a moving path, along which the robot 500 moves to a destination using current position coordinates, by matching the translation and rotation of the mobile robot 500 output from the pose calculation module 504 with the area coordinate information of a working space previously stored in the memory module 506, and controls the mobile robot 500 to move along the determined moving path.

The memory module 506 stores an operation management algorithm for autonomous navigation of the mobile robot 500 and information for the operation management algorithm. The memory module 506 stores parameters for compensating for the distortion of the lens of the camera calculated through camera calibration, the world coordinates of the light sources of the landmark array 100, and the coordinate information of the working space across which the mobile robot 500 autonomously navigates.

The method for autonomous navigation of the mobile robot using the system for autonomous navigation of the mobile robot according to the present invention is described in detail with reference to the accompanying drawings.

Figure 2:
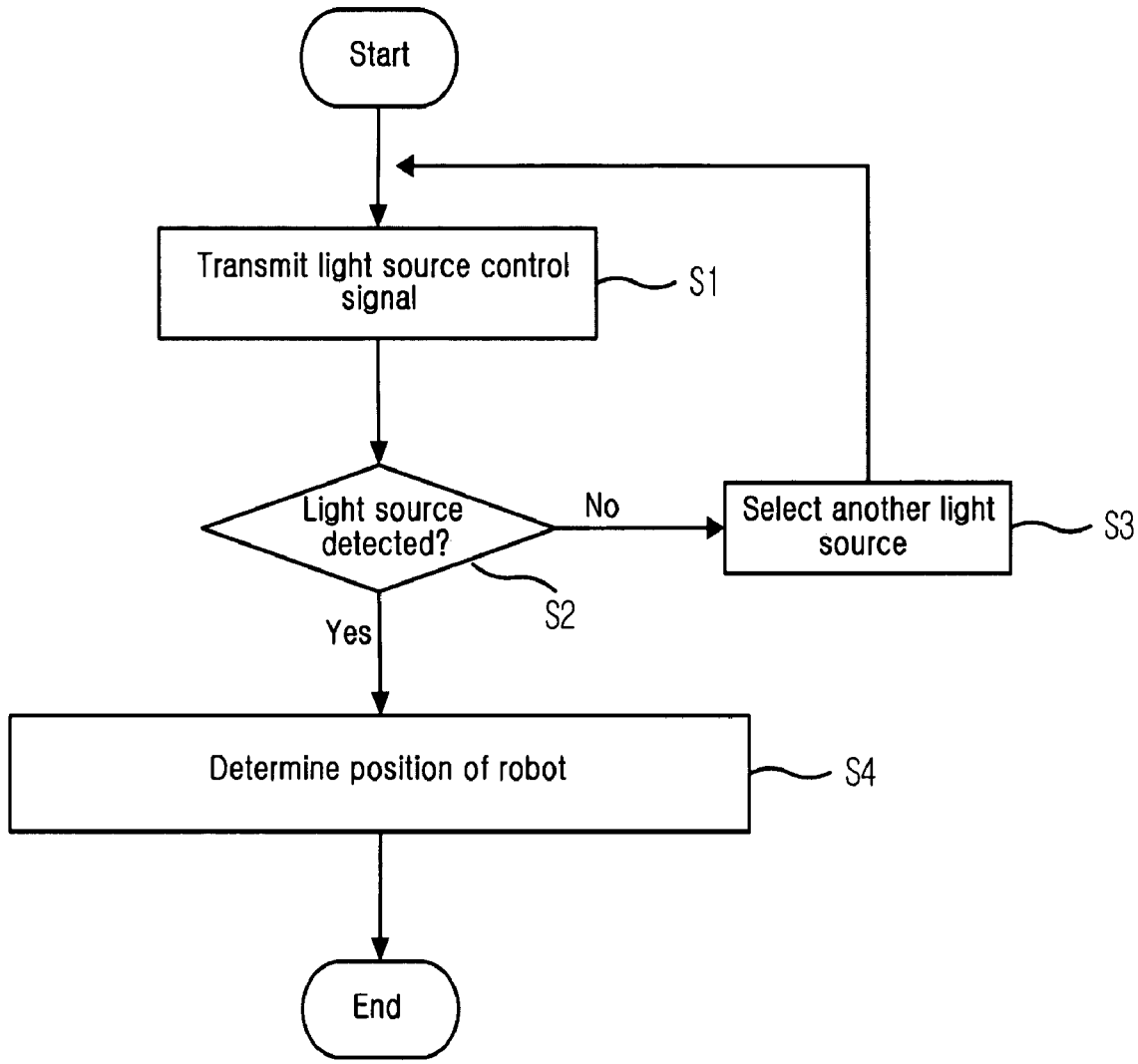
FIG. 2 is a flowchart showing a method for autonomous navigation of a mobile robot according to an embodiment of the present invention.

As shown in FIG. 2, the main control module 501 of the mobile robot 500 transmits a light source control signal (a turn on signal) to turn on the specified light sources of the landmark array 100 at step S1.

As the light source control signal transmitted from the mobile robot 500 through the access point 301 of the landmark array control module 300 is received through the access point 301 of the landmark array control module 300, a corresponding light source is turned on by the light source control unit 302, and the image processing module 503 of the mobile robot 500 determines whether the light source controlled to flicker in response to the light source control signal is detected by detecting the feature points of the light source through an image signal captured by the camera at step S2.

If the light source is not detected as the result of the determination of step S2, a light source is detected by selecting a neighboring light source with reference to the world coordinates of the light sources of the landmark array 100 previously stored in the memory module 506, transmitting a light source control signal to turn on this light source, and determining whether the light source is detected through the camera at step S3.

If the light source is detected as the result of the determination of step S3, the current position of the mobile robot 500 is determined using the image coordinates of the light source detected by the camera and the world coordinates of the light source detected by the memory module 506 at step S4.

The main control module 501 of the mobile robot 500 determines a moving path of the mobile robot 500 using current world coordinates determined through the above-described step, and controls the mobile robot 500 to move along the moving path determined by the motion control module 505.

The method for autonomous navigation of a mobile robot according to the present invention is described in detail with reference to the accompanying drawing.

Figure 3:
FIG. 3 is a perspective view of a landmark array disposed in a working space of a mobile robot according to an embodiment of the present invention.

If a house equipped with a home automation system is selected as the working space of the mobile robot, the light sources of the landmark array 100 are installed throughout the house as shown in FIG. 3 and controlled to flicker through the landmark array control module 300 provided in the server of the home automation system.

Figure 4:
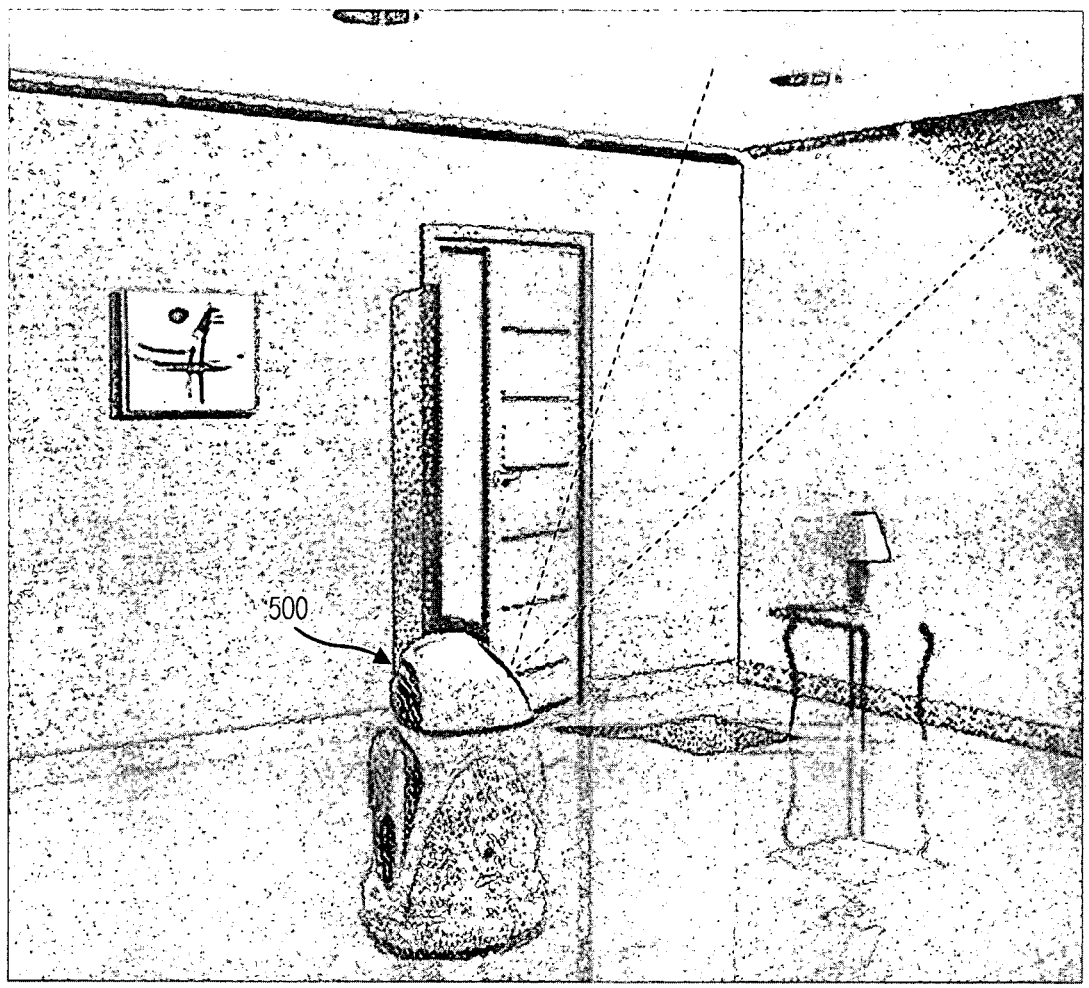
FIG. 4 is a perspective view of the mobile robot having been moved to a certain position according to an embodiment of the present invention.

When the light source is turned on in the state where the mobile robot 500 is moved to a random position in the working space of the mobile robot 500, as shown in FIG. 4, the mobile robot 500 roughly determines the current position thereof through an initializing process and precisely calculates the current position thereof through a localization process.

Figure 5:
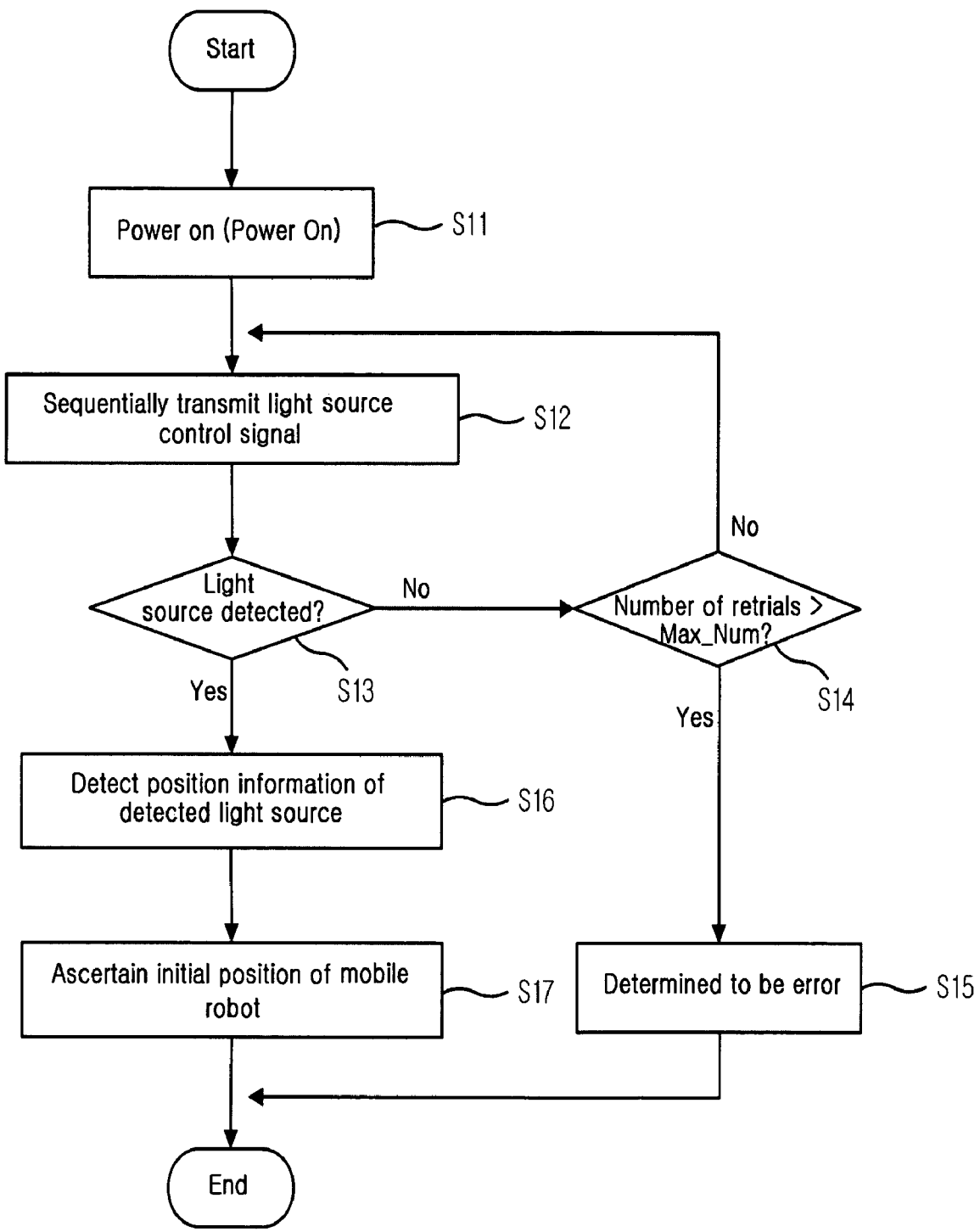
FIG. 5 is a flowchart showing the process of determining an initial position according to an embodiment of the present invention.

The initialization process is the process of determining the initial position of the mobile robot as power is applied to the mobile robot, which is performed as shown in FIG. 5.

When power is applied to the mobile robot 500 at step S11, the main control module 501 of the mobile robot 500 sequentially controls the light sources of the landmark array 100 to flicker with reference to the specified light source and the world coordinates of the light sources of the landmark array 100 at step S12.

In the process of controlling the light sources of the landmark array 100 to sequentially flicker, the main control module of the mobile robot 500 detects the feature points of the light source from an image signal obtained by the camera using the image processing module 503, and determines whether the light source controlled to flicker is detected by the camera at step S13.

If the light source is not detected as the result of the determination of step S13, the process of controlling the light sources of the landmark array 100 to sequentially flicker after changing the direction of the camera by rotating the camera, and detecting the light source using an image obtained by the camera is repeated a set number of times Max_Num at step S14. If the light source is not detected after the process is repeated a randomly set number of times, the process is determined to be an error by generating a light source detection error signal at step S15.

If the light source is detected as the result of the determination of step S13, the world coordinates of the detected light source stored in the memory module 506 is detected through the use of the ID number of the detected light source at step S16, and the current position of the mobile robot 500 is roughly ascertained through the use of the world coordinates of the detected light source at step S17.

For example, in the case where the world coordinates of the light source ascertained through the use of the ID number of the light source detected by the camera during the flickering of the light source of the landmark array 100 is the position information of a living room, the main control module 501 of the mobile robot 500 can roughly ascertain that the mobile robot 500 is positioned in the living room.

When the initialization process of the mobile robot 500 is completed, the main control module 501 of the mobile robot 500 performs a position calculation process of calculating the precise position of the mobile robot 500 with reference to the rough position information obtained through the initialization process.

Figure 6:
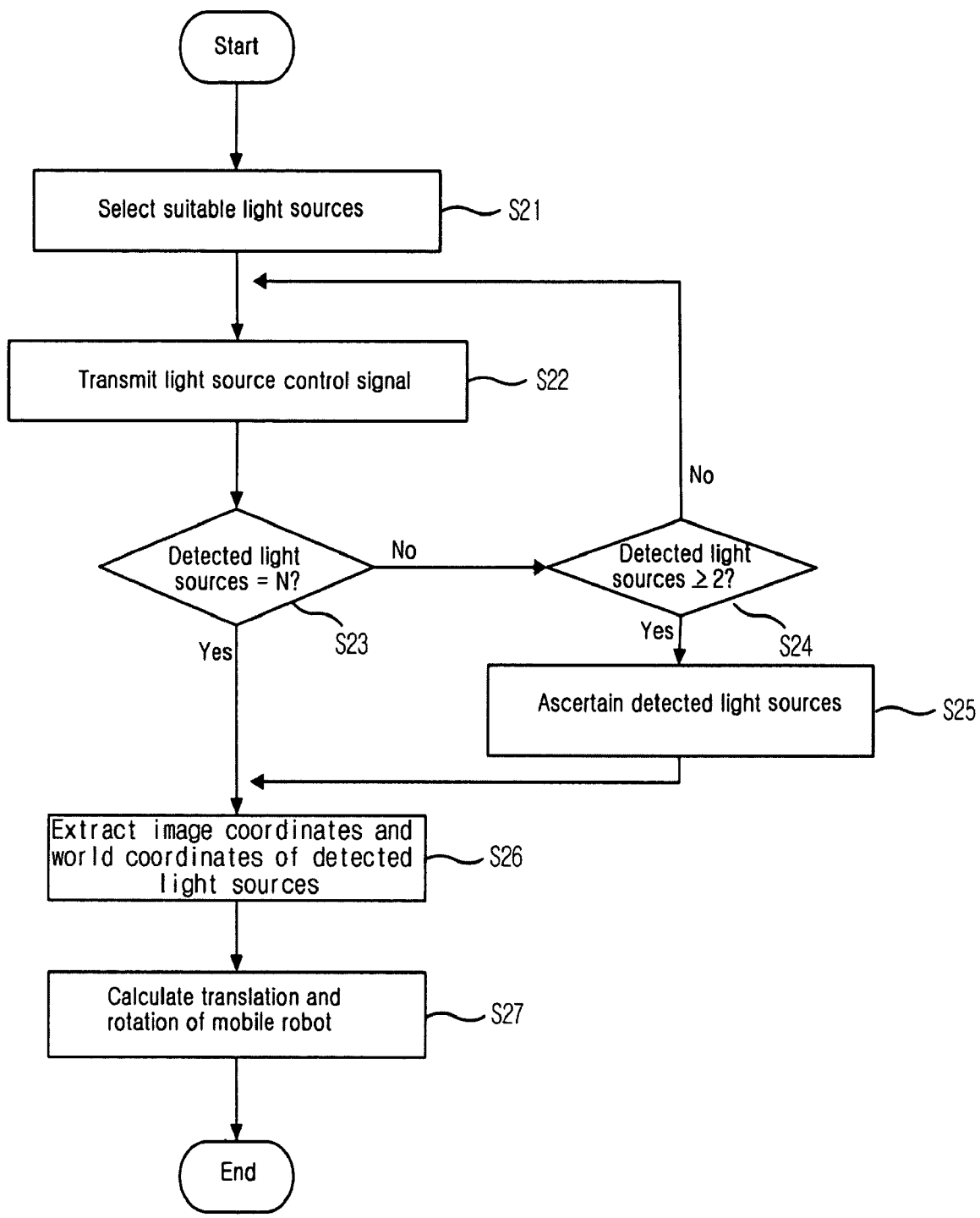
FIG. 6 is a flowchart showing the process of calculating the position of the mobile robot according to an embodiment of the present invention.

The position calculation process is performed as shown in FIG. 6. First, the main control module 501 of the mobile robot 500 sets the number of light sources, which is required to calculate the precise position of the mobile robot 500, to a certain number N.

After the number of light sources N is set to calculate the precise position, N light sources, which are suitable for the position calculation, are selected from the light sources near the light source detected during the initialization process at step S21, and a light source control signal is transmitted to turn on the selected N light sources at step S22.

For example, when the light source detected during the initialization process is a fifth light source of the living room in the case where the number of light sources required to calculate the position of the mobile robot 500 is set to five, light sources of a set number set to calculate the position can be turned on by turning on both two light sources on the right side of the fifth light source and two light sources on the left side of the fifth light source, or by turning on four light sources on the right side of the fifth light source or four light sources on the left side of the fifth light source.

The landmark array control module 300 turns on a corresponding light source in response to a transmitted light source control signal, and the main control module 501 of the mobile robot 500 detects the feature points of the light source from an image signal obtained by the camera using the image processing module 503, and determines whether the N light sources turned on to detect the position of the robot 500 are detected at step S23.

If the N light sources are not detected as the result of the determination of step S24, it is determined whether the number of light sources detected by the camera is equal to or more than two at step S24. If the number of the detected light sources is less than two, a light source detected through the camera is detected by selecting and flickering another light source at step S22. If the number of the detected light sources is two or more at step S24, the ID numbers of the light sources detected through the camera are ascertained by controlling light sources to flicker at step S25.

The image coordinates of N light sources and two or more light sources detected through the above-described determination are extracted from an image signal obtained by the camera, and world coordinates corresponding to light sources is detected from the memory module 506 using the ascertained IDs at step S26.

The pose calculation module 504 calculates the translation and rotation of the mobile robot 500 by applying the image coordinates and world coordinates of the detected light sources to the transformation formula obtained through the position calculation algorithm.

The main control module 501 of the mobile robot 500 determines a moving path for the mobile robot 500 by applying the translation and rotation of the mobile robot 500 to the spatial coordinate information of the mobile robot 500 in the working space, and controls the mobile robot 500 to move through the use of the motion control module 505.

If the number of light sources required to calculate the position of the mobile robot 500 is set to two, the image coordinates of light sources detected through an image signal obtained by the camera in the image processing module 503 of the mobile robot 500 are $(u_1, v_1)$ and $(u_2, v_2)$, and specific coordinates are $(X_{W_1}, Y_{W_1}, Z_{W_1})$ and $(X_{W_2}, Y_{W_2}, Z_{W_2})$, the translation and rotation of the mobile robot are obtained as described below.

When a displacement matrix for obtaining the translation and rotation of the mobile robot is constructed using the world coordinate system and the camera coordinate system, the camera of the mobile robot moves at a certain height and the translation with respect to a z axis is zero, the following displacement matrix is obtained.

$$t = \begin{bmatrix} t_x \\ t_y \\ t_z \end{bmatrix} = \begin{bmatrix} t_x \\ t_y \\ 0 \end{bmatrix} \quad R = \begin{bmatrix} r_{11} & r_{12} & r_{13} \\ r_{21} & r_{22} & r_{23} \\ r_{31} & r_{32} & r_{33} \end{bmatrix} = \begin{bmatrix} \cos\theta & \sin\theta & 0 \\ -\sin\theta & \cos\theta & 0 \\ 0 & 0 & 1 \end{bmatrix}$$

where t is a translation and R is a rotation.

When the displacement matrix with respect to the translation and rotation of the mobile robot is obtained, the displacement matrix is applied to a formula for compensating for distortion caused by the lens of the camera. The lens distortion compensation formula is as follows (see Three-Dimensional Computer Vision—A Geometric Viewpoint, Oliver Faugeras, 1993).

$$-\frac{f}{Z_W} = \frac{u}{X_W} = \frac{v}{Y_W} \Rightarrow \begin{matrix} u = -f\frac{X_W}{Z_W} \\ v = -f\frac{Y_W}{Z_W} \end{matrix} \xrightarrow{\text{Translation Lens/Disto.}} \begin{matrix} u = fx\frac{X_W}{Z_W} + u_0 \\ v = fy\frac{Y_W}{Z_W} + v_0 \end{matrix} \right\} \begin{bmatrix} u \\ v \\ 1 \end{bmatrix} =$$

$$\begin{bmatrix} fx & 0 & u_0 \\ 0 & fy & v_0 \\ 0 & 0 & 1 \end{bmatrix} \begin{bmatrix} X \\ Y \\ 1 \end{bmatrix} \Rightarrow m^T = AP$$

A displacement matrix with respect to translation and rotation is added to the lens distortion compensation formula. An extension model formed by including the translation and rotation matrix is as follows.

$$m = A[R \mid t]P \Rightarrow \begin{bmatrix} u_i \\ v_i \\ 1 \end{bmatrix} = \begin{bmatrix} fx & 0 & u_0 \\ 0 & fy & v_0 \\ 0 & 0 & 1 \end{bmatrix} \begin{bmatrix} \cos\theta & \sin\theta & 0 & tx \\ -\sin\theta & \cos\theta & 0 & ty \\ 0 & 0 & 1 & 0 \end{bmatrix} \begin{bmatrix} X_{wi} \\ Y_{wi} \\ Z_{wi} \\ 1 \end{bmatrix}$$

In the above matrix equation, fx, fy, $u_0$ and $v_0$ are parameter values determined according to camera characteristics through camera calibration, $u_i$ and $v_i$ are image coordinates obtained from an input image signal with respect to the feature points of the detected light sources, and $X_{W_i}, Y_{W_i}$ and $Z_{W_i}$, are the world coordinates of detected light sources.

The above matrix equation is expressed by the equations for $u_i$ and $v_i$ as described below.

$$u = f_x X_{W_i} \cos\theta + f_x Y_{W_i} \sin\theta + u_0 Z_{W_i} + f_x t_x$$

$$v = -f_x X_{W_i} \sin\theta + f_y Y_{W_i} \cos\theta + v_0 Z_{W_i} + f_y t_y \quad (1)$$

The translation $t_x$ and $t_y$, and rotation $\theta$ of the mobile robot are obtained with reference to the coordinate information $(u_1, v_1)$ and $(u_2, v_2)$, and $(X_{W_1}, Y_{W_1}, Z_{W_1})$ and $(X_{W_2}, Y_{W_2}, Z_{W_2})$ of light sources detected by the camera as described below.

$$t_x = \frac{u_1 - f_x X_{W_1} \cos\theta - f_x Y_{W_1} \sin\theta - u_0 Z_{W_1}}{f_x}$$

$$t_y = \frac{v_1 + f_y X_{W_1} \sin\theta - f_y Y_{W_1} \sin\theta - v_0 Z_{W_1}}{f_y}$$

$$\cos\theta = \frac{u_2 - f_x(Y_{W_2} - Y_{W_1})\sin\theta - u_0(Z_{W_2} - Z_{W_1})}{f_x(X_{W_2} - X_{W_1})}$$

-continued $$\sin\theta = \frac{f_y u_2(Y_{W_2} - Y_{W_1}) - u_0 f_y \frac{(X_{W_2} - X_{W_1})(Y_{W_2} - Y_{W_1})}{(Z_{W_2} - Z_{W_1})} + \frac{v_0(Z_{W_2} - Z_{W_1})(X_{W_2} - X_{W_1})}{f_x(X_{W_2} - X_{W_1})^2 + (Y_{W_2} - Y_{W_1})^2}}$$

By the above process, the pose calculation module calculates the current position of the mobile robot 500 and ascertains precise current position of the mobile robot 500 by applying the calculated translation and rotation values to spatial coordinates with respect to the working space of the mobile robot 500.

If the position of the mobile robot is calculated through n light sources, equation 1 is converted into the following matrix equation.

$$\begin{bmatrix} u_i \\ v_i \end{bmatrix} = \begin{bmatrix} f_x X_{W_i} & f_x Y_{W_i} & f_x & 0 \\ f_y X_{W_i} & -f_y X_{W_i} & 0 & f_y \end{bmatrix} \begin{bmatrix} \cos\theta \\ \sin\theta \\ t_x \\ t_y \end{bmatrix} + \begin{bmatrix} u_i Z_{W_i} \\ v_i Z_{W_i} \end{bmatrix} \quad (2)$$

The image coordinates and world coordinates of the n light sources are applied to the converted equation 2 as described below.

$$\begin{bmatrix} f_x X_{W_1} & f_x Y_{W_1} & f_x & 0 \\ f_y Y_{W_1} & -f_y X_{W_1} & 0 & f_y \\ \ldots & \ldots & \ldots & \ldots \\ f_x X_{W_n} & f_x Y_{W_n} & f_x & 0 \\ f_y Y_{W_n} & -f_y X_{W_n} & 0 & f_y \end{bmatrix} \begin{bmatrix} \cos\theta \\ \sin\theta \\ t_x \\ t_y \end{bmatrix} = \begin{bmatrix} u_1 \\ v_1 \\ \ldots \\ u_n \\ v_n \end{bmatrix} -$$

$$\begin{bmatrix} u_0 Z_{W_1} \\ v_0 Z_{W_1} \\ \ldots \\ u_n Z_{W_n} \\ v_n Z_{W_n} \end{bmatrix} \Rightarrow AX = U \Rightarrow X = (A^T A)^{-1} A^T U$$

With the above process, the current position of the mobile robot 500 is calculated. The main control module 501 of the mobile robot 500 ascertains the precise current position of the mobile robot 500 by applying the calculated translation and rotation values to the previously stored spatial coordinates with respect to the working space of the mobile robot 500.

Additionally, a moving path for the mobile robot to move to a destination is determined using the position information, and the mobile robot 500 is controlled to move through the motion control module 505.

In accordance with the present invention, the mobile robot can move to a precise destination by controlling the light sources of a landmark array to flicker and ascertaining its position.

The mobile robot selects a certain light source useful to the calculation of its position from the light sources of the landmark array, and efficiently calculates its position with reference to the previously stored world coordinates of the light sources of the landmark array.

Additionally, the landmark array of the present invention uses a plurality of light sources having a certain wavelength, so it can be used as a means for providing position information to aid the mobile robot in performing autonomous navigation in a house environment without being influenced by the variations of a house environment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile robot, comprising:
    a communications module for transmitting a light source control signal to selectively control flickering of each of a plurality of light sources of a landmark array provided in a working space such that each of said plurality of light sources can be separately detected by its flickering;
    an image processing module for calculating image coordinates of at least one of the plurality of the light sources by separately detecting the at least one light source by selectively controlling the flickering the light source, controlled to flicker in response to the light source control signal, from an image signal obtained by a camera;
    a pose calculation module for calculating world position coordinates of the mobile robot in the working space using the calculated image coordinates and previously stored world coordinates of the light sources;
    a motion control module for calculating a moving path in the working space for the mobile robot by applying the position coordinates of the mobile robot to previously stored spatial coordinates of the working space and controlling the mobile robot to move along the moving path in the working space; and
    a main control module for controlling interoperations of the communications, image processing, pose calculation and motion control modules of the mobile robot.

2. The mobile robot as set forth in claim 1, further comprising a memory module for storing the world coordinates of the light sources, spatial coordinates of the mobile robot in the working space, and parameters calculated through camera calibration for compensating for distortion of a lens of the camera.

3. The mobile robot as set forth in claim 1, wherein the pose calculation module calculates translation and rotation of the robot by applying the image coordinates and the world coordinates to a position calculation algorithm.

4. The mobile robot as set forth in claim 3, wherein the pose calculation algorithm is a certain transformation matrix equation that is obtained by constructing an extension model for obtaining a translation and a rotation of the camera using a world coordinate system and a camera coordinate system and applying the extension model to a formula for compensating for distortion caused by a lens of the camera.

5. A system for autonomous navigation of a mobile robot, comprising:
    a landmark array comprising a plurality of light sources disposed in a working space to selectively flicker;
    a landmark array control module for separately controlling each of the light sources of the plurality of light sources of the landmark array to flicker; and
    a mobile robot equipped with a pose calculation module for selectively controlling each of the light sources in the plurality of light sources of the landmark array to flicker such that each of said plurality of light sources can be separately detected by transmitting a light source control signal to the landmark array control module and recognizing a world position of the mobile robot in a working space using image coordinates of detected light sources, controlled to flicker in response to the light source control signal, extracted from an image signal.

6. The system as set forth in claim 5, wherein the light sources are light emitting devices, including electro-luminescent devices and light emitting diodes, which emit light with a certain wavelength and a certain brightness.

7. The system as set forth in claim 5, wherein the light sources are each assigned with position information comprised of a specific identification number and world coordinates in the working space in which the landmark array is arranged.

8. The system as set forth in claim 5, wherein the landmark array control module comprises:
   an access point for receiving and processing the light source control signal transmitted from the mobile robot; and
   a light source control unit for controlling corresponding light sources to flicker in response to the light source control signal input from the access point.

9. The system as set forth in claim 8, wherein the communications module and the access point are assigned with frequencies of a high bandwidth and transmit/receive data via the assigned frequencies, or the communications module and the access point transmit/receive the light source control signal through infrared data communications using infrared radiation or through data communications based on wireless communications protocols.

10. The system as set forth in claim 5, wherein the pose calculation module calculates translation and rotation of the robot by applying image coordinates and world coordinates to a certain pose calculation algorithm.

11. The system as set forth in claim 10, wherein the pose calculation algorithm is a certain transformation matrix equation that is obtained by constructing an extension model for obtaining a translation and a rotation of the camera using a world coordinate system and a image coordinate system, and applying the extension model to a formula for compensating for distortion caused by a lens of the camera.

12. The system as set forth in claim 10, wherein the communications module and the access point are assigned with frequencies of a high bandwidth and transmit/receive data via the assigned frequencies, or the communications module and the access point transmit/receive the light source control signal through infrared data communications using infrared radiation or through data communications based on wireless communications protocols.

13. The system as set forth in claim 5, wherein the mobile robot comprises:
   a main control module for controlling an entire operation for pose recognition and moving according to an operation management algorithm for autonomous navigation of the mobile robot;
   a communications module for transmitting the light source control signal to control light sources of the landmark array under control of the main control unit;
   an image processing module for detecting feature points of the light source, controlled to flicker through the communications module, from the image signal obtained by the camera;
   a motion control module for controlling the mobile robot to move under control of the main control module; and
   a memory module for storing parameters calculated through camera calibration for compensating for distortion caused by a lens of the camera, world coordinates of the light sources, and spatial coordinates of the mobile robot in the working space.

14. The system as set forth in claim 13, wherein the image processing module comprises;
   a camera equipped with a filter for filtering the wavelength of the light source from the image signal obtained by the camera; and
   a signal processing unit for detecting the wavelength of the light source from the filtered image signal output by the camera.

15. A method for autonomous navigation of a mobile robot, comprising the steps of:
   (1) the mobile robot selectively controlling each of a plurality of light sources of a landmark array arranged across a certain working space to flicker by transmitting a light source control signal to the landmark array such that each of the light sources can be separately detected;
   (2) extracting image coordinates of at least one of the plurality of the light sources by detecting a light source by the selectively controlled flickering the light source, controlled to flicker in response to the light source control signal, from an image signal input from a camera; and
   (3) calculating a current world position of the mobile robot with reference to the extracted image coordinates and previously stored world coordinates of the detected light source.

16. The method as set forth in claim 15, further comprising:
   (4) a motion control module determining a moving path to a destination using the calculated current position and controlling the mobile robot to move along the determined moving path.

17. The method as set forth in claim 15, wherein the first step comprises the steps of:
   transmitting a light source control signal to a landmark array control module to control a specified one of the light sources of the landmark array to flicker; and
   the landmark array control module controlling the specified light source to flicker in response to the light source control signal.

18. The method as set forth in claim 15, wherein the second step comprises the steps of:
   detecting feature points of the light source from the image signal input from the camera;
   determining whether the light source is detected by the camera using the feature points of the light source;
   searching for the light source detected by the camera by sequentially controlling light sources near a previously tried light source to flicker if the previously tried light source is not detected; and
   extracting image coordinates of a detected light source from the image signal if any light source is detected.

19. The method as set forth in claim 15, wherein the third step comprises the steps of:
   detecting position information of the detected light source;
   calculating the pose of the mobile robot with reference to the calculated position of the mobile robot; and
   ascertaining a precise position of the mobile robot by matching the calculated position of the mobile robot with spatial coordinate information of the working space previously stored in the mobile robot.

20. The method as set forth in claim 15, wherein the mobile robot detects two or more light sources by repeating the first and second steps so as to precisely ascertain the position of the mobile robot.

* * * * *